US012773685B2

(12) United States Patent
Weiss et al.

(10) Patent No.: US 12,773,685 B2
(45) Date of Patent: Oct. 27, 2026

(54) TRIPLE-LAYERED ACTIVE MATERIAL WITH COMPOSITE PHASE INTERMEDIATE LAYER, ITS PREPARATION AND REGENERATION METHODS

(71) Applicant: ExxonMobil Chemical Patents Inc., Baytown, TX (US)

(72) Inventors: Brian M. P. Weiss, Bridgewater, NJ (US); Changmin Chun, Raritan, NJ (US); Sophie Liu, Hampton, NJ (US); Federico Barrai, Houston, TX (US); Paul F. Keusenkothen, Houston, TX (US); Zachary D. Young, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1204 days.

(21) Appl. No.: 17/627,832

(22) PCT Filed: Jul. 30, 2020

(86) PCT No.: PCT/US2020/044234
§ 371 (c)(1),
(2) Date: Jan. 18, 2022

(87) PCT Pub. No.: WO2021/025942
PCT Pub. Date: Feb. 11, 2021

(65) Prior Publication Data
US 2022/0401924 A1 Dec. 22, 2022

Related U.S. Application Data

(60) Provisional application No. 62/881,972, filed on Aug. 2, 2019.

(30) Foreign Application Priority Data
Nov. 12, 2019 (EP) .................................... 19208581

(51) Int. Cl.
*B01J 23/34* (2006.01)
*B01J 21/00* (2006.01)
(Continued)

(52) U.S. Cl.
CPC ............ *B01J 23/34* (2013.01); *B01J 21/005* (2013.01); *B01J 21/02* (2013.01); *B01J 23/005* (2013.01);
(Continued)

(58) Field of Classification Search
CPC .... B01J 23/005; B01J 23/1034; B01J 21/005; B01J 21/02; B01J 35/56; B01J 37/0225;
(Continued)

(56) References Cited

U.S. PATENT DOCUMENTS

| | | | |
|---|---|---|---|
| 5,883,041 | A | 3/1999 | Pak et al. |
| 9,394,214 | B2 | 7/2016 | Henao et al. |

(Continued)

FOREIGN PATENT DOCUMENTS

| | | | |
|---|---|---|---|
| RU | 2120333 | C1 | 10/1998 |
| WO | 2018/232133 | A1 | 12/2018 |
| WO | 2021/025942 | A1 | 2/2021 |

OTHER PUBLICATIONS

Berman, Alexander, Rakesh K. Karn, and Michael Epstein. "A new catalyst system for high-temperature solar reforming of methane." Energy & Fuels 20.2 (2006): 455-462.*

(Continued)

*Primary Examiner* — Richard M Rump
(74) *Attorney, Agent, or Firm* — WOMBLE BOND DICKINSON (US) LLP; Kevin Davis

(57) ABSTRACT

An active material useful in an oxidative dehydrogenation reactor system has an active phase, a support phase, and an intermediate composite phase. The active phase includes a transition metal oxide such as manganese oxide, which is
(Continued)

reversibly oxidizable and/or reducible between oxidized and reduced states. The support phase includes an oxide of a IUPAC Group 2-14 element. The composite phase is a mixed metal oxide of the transition metal and the Group 2-14 element. The active phase can also include a promoter such as Na-W04 and/or a selectivity modifier such as A1 or ceria. Also, a reactor including the active material in a reactor, a method of making the active material, and a method of using the active material in a regenerative reaction process.

25 Claims, 4 Drawing Sheets

(51) Int. Cl.

| | |
|---|---|
| ***B01J 21/02*** | (2006.01) |
| ***B01J 23/00*** | (2006.01) |
| ***B01J 23/10*** | (2006.01) |
| ***B01J 35/56*** | (2024.01) |
| ***B01J 37/02*** | (2006.01) |
| ***B01J 37/08*** | (2006.01) |
| ***B01J 38/18*** | (2006.01) |
| ***B01J 38/30*** | (2006.01) |

(52) U.S. Cl.
CPC ............... *B01J 23/10* (2013.01); *B01J 35/56* (2024.01); *B01J 37/0225* (2013.01); *B01J 37/088* (2013.01); *B01J 38/18* (2013.01); *B01J 38/30* (2013.01)

(58) Field of Classification Search
CPC .......... B01J 37/088; B01J 38/18; B01J 38/30; C01G 45/00; C01G 45/02; C01G 45/022; C01G 45/05; C01G 45/026; C01G 45/028
See application file for complete search history.

(56) References Cited

U.S. PATENT DOCUMENTS

| | | | |
|---|---|---|---|
| 9,399,605 | B2 | 7/2016 | Henao et al. |
| 2004/0132615 | A1 | 7/2004 | Fisher et al. |
| 2006/0257675 | A1 | 11/2006 | Chun et al. |
| 2015/0148216 | A1 | 5/2015 | Nazarpoor et al. |
| 2019/0055178 | A1 | 2/2019 | Weiss et al. |
| 2022/0274085 | A1 | 9/2022 | Weiss et al. |

OTHER PUBLICATIONS

Kim, Yunkyum, et al. “Effect of dew point on the formation of surface oxides of twinning-induced plasticity steel.” Materials characterization 89 (2014): 138-145.*

Shaheen, W. M., and K. S. Hong. “Thermal Characterization and Physico-Chemical Properties of Fe 2 O 3—Mn 2 O 3/Al 2 O 3 Systems.” Journal of thermal analysis and calorimetry 68 (2002): 289-306.*

Deraz, Nasr-Allah M. “Physicochemical, surface, and catalytic properties of pure and ceria-doped manganese/alumina catalysts.” Chinese Journal of Catalysis 29.8 (2008): 687-695.*

English machine translation of RU-2120333-C1 (1998).*

Yu, Z. Q., et al. “Oxidative coupling of methane over Na2WO4/CeO2 and related catalysts.” Journal of Catalysis 154.1 (1995): 163-173.*

Yusuf, Seif, Luke M. Neal, and Fanxing Li. “Effect of promoters on manganese-containing mixed metal oxides for oxidative dehydrogenation of ethane via a cyclic redox scheme.” Acs Catalysis 7.8 (2017): 5163-5173.*

Chytil, Svatopluk, et al. “Preparation and characterization of MnxOy-Al2O3 sorbents for H2S removal from biomass gasification gas.” Energy Procedia 26 (2012): 98-106.*

Fang, H. et al., (2009) “Advancements in Development of Chemical-Looping Combustion: A Review”, International Journal of Chemical Engineering, vol. 2009, 17 Pages.

* cited by examiner

TRIPLE-LAYERED ACTIVE MATERIAL WITH COMPOSITE PHASE INTERMEDIATE LAYER, ITS PREPARATION AND REGENERATION METHODS

CROSS-REFERENCE TO RELATED APPLICATIONS

This application is a US national phase application of PCT Application Serial No. PCT/US2020/044234 having a filing date of Jul. 30, 2020, which claims priority to and the benefit of U.S. Provisional Application No. 62/881,972 having a filing date of Aug. 2, 2019 and European Patent Application No. 19208581.9 having a filing date of Nov. 12, 2019, the disclosures of all of which are incorporated herein by reference in their entireties.

FIELD

This disclosure relates to active materials, processes for making the same, reactors comprising the same, and use thereof. In particular, this disclosure relates to active materials comprising a transition metal element and a support, reactors comprising the same, processes for making the same, and use thereof. This disclosure is useful, e.g., in converting alkanes to form olefins.

BACKGROUND

The oxydehydrogenation of alkanes to form olefins in a reverse flow reactor (RFR) using an oxygen transfer agent (OTA) is known from patent document US 2019/0055178 A1. This reference discloses various OTAs based on manganese or manganese composites, including $Mn_2O_3$ on silica or quartz, $Mn_2O_3$ on $MnTiO_3$, $CaMnO_3$, $Mn_3O_4/Na_2WO_4/MnWO_4$, etc. Similarly, patent documents U.S. Pat. Nos. 9,394,214 and 9,399,605, both of which are incorporated herein by reference in their entireties, disclose the use of oxygen storage media such as perovskites and perovskite-like materials in chemical looping RFRs to oxidatively couple methane molecules to form longer-chained hydrocarbons.

However, at the high temperature conditions present in the RFRs, OTA materials used in RFRs to date can suffer from poor strength, low stability, low activity, high pressure drop, high cost, environmental unsuitability, etc., especially after being subjected to repeated cycles of heating and cooling, oxidation and reduction, and so on. Composites in particular are prone to attrition due to different rates of thermal expansion of the different materials, which can lead to lost activity and reduced efficiency, as well as pressure drop increases and plugging. Often, techniques for strengthening materials for high temperature can result in inactivation or loss of efficiency of the material. It would be useful therefore to improve material integrity for use in high temperature reactors without substantial adverse impact on activity and efficiency.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

It has been found that that the robustness of a phase of a first metal oxide $M^1Ox$ employed as a supported active material, where $M^1$ is the first metal and x is a number providing electroneutrality depending on the average valence of $M^1$, can be improved by using a support comprising a composite phase of a mixed first metal-second metal oxide, e.g., $(M^1,M^2)_3O_4$, where $M^2$ is the second metal. This active material may be used to advantage in high temperature reactors for its high stability under thermal cycling conditions, such as fluidized bed reactors, reverse flow reactors (RFRs), or other types of reactors.

In one aspect, embodiments according to this disclosure provide an active material comprising an active phase, a support phase, and a composite phase intermediate the active phase and the support phase. The active phase comprises an oxide of a first element selected from transition metal elements, wherein the transition metal oxide is reversibly oxidizable and/or reducible between oxidized and reduced states, wherein the transition metal oxide is present in the oxidized state, the reduced state, or a combination thereof. The support phase comprises an oxide of a second element selected from IUPAC Group 2-14 elements. The composite phase comprises a mixed metal oxide of the first element and the second element. In another aspect, embodiments of this disclosure provide a reactor comprising the active material disposed in a chemical looping reactor.

In a further aspect, a method of making the active material comprises the steps of: providing a substrate comprising the support phase; forming a layer of the composite phase on the substrate; and coating the layer of the composite phase with the active phase.

In yet another aspect, embodiments of this disclosure provide a regenerative reaction process, comprising the sequential steps of:

(a) disposing the active material into a reactor member;

(b) for a first period of time, contacting the oxidized state of the active phase of the active material in the reactor member with an oxidizable reactant at pressure, temperature, and flow rate conditions to reduce the active phase to the reduced state and form a reaction product;

(c) for a second period of time, contacting the reduced state of the active phase of the active material in the reactor member with an oxidant to regenerate the active phase to the oxidized state for reduction in step (b); and (d) sequentially repeating steps (b) and (c) one or more times.

DETAILED DESCRIPTION

Figure 1:
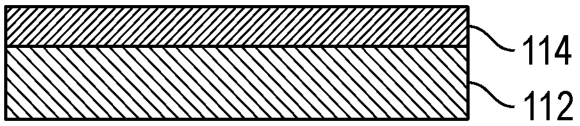
FIG. 1 is a simplified schematic diagram of an alumina substrate and a manganese oxide wash coat in a fabrication method according to an embodiment of this disclosure.

Throughout the entire specification, including the claims, the following terms shall have the indicated meanings. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles “a” and “an” as used herein mean one or more when applied to any feature in embodiments and implementations of this disclosure described in the specification and claims. The use of “a” and “an” does not limit the meaning to a single feature unless such a limit is specifically stated. The term “a” or “an” entity refers to one or more of that entity. As such, the terms “a” (or “an”), “one or more” and “at least one” can be used interchangeably herein.

About: As used herein, “about” refers to a degree of deviation based on experimental error typical for the particular property identified. The latitude provided the term “about” will depend on the specific context and particular property and can be readily discerned by those skilled in the art. The term “about” is not intended to either expand or limit the degree of equivalents which may otherwise be afforded a particular value. Further, unless otherwise stated, the term “about” shall expressly include “exactly,” consistent with the discussion below regarding ranges and numerical data. All numerical values within the detailed description and the claims herein are modified by “about” or “approximately” the indicated value, and take into account experimental error and variations that would be expected by a person having ordinary skill in the art.

And/or: The term “and/or” placed between a first entity and a second entity means one of (1) the first entity, (2) the second entity, and (3) the first entity and the second entity. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements). As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of”.

Comprising: In the claims, as well as in the specification, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures, Section 2111.03. Any device or method or system described herein can be comprised of, can consist of, or can consist essentially of any one or more of the described elements.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting “greater than 10” (with no upper bounds) and a claim reciting “less than 100” (with no lower bounds). In the figures, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

The term "active" refers to substance having an element or compound that participates as a reactant in a chemical reaction and may optionally have catalytic characteristics.

The term "alkane" means substantially saturated compounds containing hydrogen and carbon only, e.g., those containing <1% (molar basis) of unsaturated carbon atoms. The term alkane encompasses $C_2$ to $C_6$ linear, iso, and cyclo alkanes.

The term "$C_n$" hydrocarbon wherein n is a positive integer, e.g., 1, 2, 3, 4, or 5, means hydrocarbon having n carbon atom(s) per molecule.

The term "$C_{n+}$" hydrocarbon wherein n is a positive integer, e.g., 1, 2, 3, 4, or 5, means hydrocarbon having at least n carbon atom(s) per molecule.

The term "$C_{n-}$" hydrocarbon wherein n is a positive integer, e.g., 1, 2, 3, 4, or 5, means hydrocarbon having no more than n number of carbon atom(s) per molecule.

The term "cycle time" means the time from a first interval to the next first interval, including (i) intervening second, third, and/or fourth intervals and (ii) any dead-time between any pair of intervals.

The term "flow-through reactor" refers to a reactor design in which one or more reagents enter a reactor, typically an elongated channel or stirred vessel, at an inlet, flow through the reactor, and then a product mixture (including any unreacted reagents) is continuously or semi-continuously collected at an outlet. Flow-through reactors include continuous reactors, as well as semi-continuous reactors in which one phase flows continuously through a vessel containing a batch of another phase, e.g., fixed-bed reactors where a fluid phase passes through a solid phase of catalyst, reactant, active material, etc.

With respect to flow-through reactors, the term "region" means a location within the reactor, e.g., a specific volume within the reactor and/or a specific volume between a flow-through reactor and a second reactor, such as a second flow-through reactor. With respect to flow-through reactors, the term "zone", refers to a specific function being carried out at a location within the flow-through reactor. For example, a "reaction zone" or "reactor zone" is a volume within the reactor for conducting at least one of oxidative coupling, oxydehydrogenation and dehydrocyclization. Similarly, a "quench zone" or "quenching zone" is a location within the reactor for transferring heat from products of the catalytic hydrocarbon conversion, such as $C_{2+}$ olefin.

The term "hydrocarbon" means compounds containing hydrogen bound to carbon, and encompasses (i) saturated hydrocarbon, (ii) unsaturated hydrocarbon, and (iii) mixtures of hydrocarbons, including mixtures of hydrocarbons (saturated and/or unsaturated) having different values of n.

The term "oxidant" means any oxygen-bearing material which, under the conditions in the reaction zone, yields oxygen for transfer to the oxygen storage material, for storage with and subsequent release from the oxygen storage material to the oxidative coupling and/or oxydehydrogenation. While not wishing to be limited to theory, molecular oxygen atoms may be provided as a reactive gas in a gaseous zone and/or atomic oxygen may be provided from a catalyst surface as, for instance, reacted, sorbed forms.

The terms "oxidized state" and "reduced state" refer to relative states of oxidation and reduction with respect to a reference state. For example, in compositions of the formulae $Mn^{+2}_{A1}Mn^{+3}_{B1}O_x$ and $Mn^{+2}_{A2}Mn^{+3}_{B2}O_y$, where x<y, A1>A2, and B1<B2, $Mn^{+2}_{A1}Mn^{+3}_{B1}O_x$ is the reduced state compound and $Mn^{+2}_{A2}Mn^{+3}_{B2}O_y$ is the oxidized state compound.

The term "oxydehydrogenation" means oxygen-assisted dehydrogenation of an alkane, particularly a $C_{2+}$ alkane, to produce an equivalent alkene and water.

The term "reaction stage" or "reactor stage" means at least one flow-through reactor, optionally including means for conducting one or more feeds thereto and/or one or more products away therefrom.

The term "residence time" means the average time duration for non-reacting (non-converting by oxidative coupling) molecules (such as He, $N_2$, Ar) having a molecular weight in the range of 4 to 40 to traverse the reactor or a defined zone within the reactor, such as a reaction zone of a oxidative coupling reactor.

The term "spinel" refers to the cubic crystalline structure of the spinel class of minerals typified by the mineral spinel, $MgAl_2O_4$, or a material having such a structure. A spinel has the general formula $AB_2X_4$, where X is an anion such as chalcogen, e.g., oxygen or sulfur, arranged in a cubic close-packed lattice, and A and B are cations, which may be different or the same, occupying some or all of the octahedral and tetrahedral sites in the lattice, also including the so-called inverse spinels where the B cations may occupy some or all of the typical A cation sites and vice versa. Although the charges of A and B in the prototypical spinel structure are +2 and +3, respectively, i.e., $A^{2+}B^{3+}{}_2X^{2-}{}_4$, other combinations incorporating divalent, trivalent, or tetravalent cations, including manganese, aluminum, magnesium, zinc, iron, chromium, titanium, silicon, and so on, are also possible.

The term "unsaturated" means a $C_n$ hydrocarbon containing at least one carbon atom directly bound to another carbon atom by a double or triple bond.

This disclosure provides an active material comprising an active phase, a support phase, and a composite phase intermediate the active and support phases.

In any embodiment, the active phase can comprise an oxide of a first element selected from transition metal elements. The transition metal oxide is reversibly oxidizable and/or reducible between oxidized and reduced states. The transition metal oxide may be present in the oxidized state, the reduced state, or a combination thereof. The support phase generally comprises an oxide of a second element selected from IUPAC Group 2-14 elements. The composite phase comprises a mixed metal oxide of the first element and the second element.

The oxidation state of the transition metal oxide is generally determined by temperature and oxygen partial pressure of the process conditions, and the transition metal oxide is present in the oxidized state, the reduced state, or a combination thereof. Any suitable transition metal oxide that is stable at high temperatures, economical, and environmentally benign, may be used in the active phase. For the purposes of clarity and convenience, the following discussion addresses manganese as a preferred example of the active phase transition metal.

In the oxidized state, manganese oxide can be any of a variety of manganese oxides including manganese (II) oxide (MnO), manganese (II, III) oxide ($Mn_3O_4$), manganese (III) oxide ($Mn_2O_3$), manganese (IV) oxide ($MnO_2$, a k a manganese dioxide), manganese (VI) oxide ($MnO_3$), and manganese (VII) oxide ($Mn_2O_7$). In the reduced state, the manganese can be metallic (Mn(0)), or any lesser oxidized manganese oxide than the oxidized state. By way of example, the oxidized state of the manganese can be $Mn_2O_3$, and the reduced state can be MnO. The oxidized state of the transition metal oxide preferably comprises a spinel structure.

In any embodiment, the active phase can further comprise doping with the second element of the support phase. As a non-limiting example, aluminum-doped manganese oxide (1:10 Al:Mn) can be prepared by dissolving an appropriate quantity of aluminum isopropoxide into water, heating the mixture at 90 °C for 1 h while stirring, combining with an aqueous solution of manganese acetate, concentrating the resulting mixture at 90 °C, and then calcining the resulting gel at 900 °C for 2 h and cooling to ambient temperature. Optionally, sodium and tungsten can be added by dissolving a sodium source (e.g. sodium hydroxide), a tungsten source (e.g. tungstic acid), and optionally, an amine (e.g. triethanolamine) in water, adding the resulting solution to manganese oxide, and calcining at 900 °C for 2 h. The resulting Mn—Al—Na—W composite active material is characterized by having a diffraction pattern comprising a MnOx phase and optionally an $Na_2WO_4$ phase and an $MnWO_4$ phase. See FIG. 8.

The $MnO_x$ phase can be any of those listed above (e.g. $Mn_2O_3$, $Mn_3O_4$, MnO). The lattice constant of the $MnO_x$ phase is typically shifted from pure $MnO_x$ which indicates incorporation of $Al_2O_3$ into the $MnO_x$ phase. For example, the $MnO_x$ phase may be $Mn_2O_3$ structure (space group #206) with a lattice constant of 9.33 A, which compares to a lattice constant of 9.41 A for pure $Mn_2O_3$. Optionally, the aluminum doped manganese oxide phase may be mixed with additional non-doped manganese material. In this case, the aluminum doped manganese oxide phase may comprise the material with the diffraction pattern described above. In another embodiment, the mixed aluminum-manganese phase may comprise the spinel structure, $(Mn,Al)_3O_4$. These phases may be co-mingled by standard methods, such as by ball-milling or mixing in a slurry phase. The manganese oxide active phase and/or composite phase can be applied on the support phase by a wash coating method. The manganese oxide active phase can be a fine oxide powder or precursors of the oxide phase. As non-limiting illustrative examples, the precursors can be carbonates, nitrates, sulfates, chlorides, alkoxides of metallic manganese. Fine oxide powder or precursors of the active oxide phase can be mixed to achieve a desired mass ratio of the active phase and the support phase.

One aspect of this disclosure is open porosity of the active material, which is preferably at the surface of the active phase. The volume percent of open pores in the active material is preferably in the range of 5 to 60 vol %, more preferably 10 to 50 vol %, and even more preferably 20 to 40 vol % of the active material. The open pores that are present in the active phase increase surface area of the active phase. The open pores are preferably connected and uniformly distributed in the active phase.

In the manganese oxide based active materials, the active phase is preferably present in the range of 1 to 20 wt % based on the total weight of the active material, including the active phase, support phase, and composite phase. Preferably, the active phase is in the range of 3 to 15 wt. %. More preferably, the active phase is in the range of 5 to 10 wt. %. (Optimum ranges may be adjusted later).

In any embodiment of this disclosure, the active phase can include a promoter, which can effectively suppress the undesired $CO_x$ formation during the redox process in an oxidative dehydrogenation (ODH) reaction. A preferred ODH promoter is sodium tungstate ($Na_2WO_4$), which is mentioned in the following discussion for the purposes of illustrative simplicity and clarity. As non-limiting illustrative examples, the precursors of sodium tungstate can be carbonates, nitrates, sulfates, chlorides, alkoxides of metals comprising sodium and tungsten. The precursors of sodium tungstate can be mixed to achieve a desired mass ratio of the active phase. In the manganese oxide based active phase, the promoter is preferably in the range of 5 to 20 wt %, and more preferably in the range of 7 to 12 wt %, based on the total weight of the manganese oxide active phase.

In any embodiment of this disclosure, the active phase may further comprise a selectivity additive, e.g., cerium, to give preferential selectivity for hydrogen oxidation in an ODH system. As a non-limiting example, cerium nitrate in water is applied to $Mn_3O_4$ powder support for incipient wetness impregnation, and dried. Subsequently, a mixture of ammonium metatungstate and sodium tungstate in water can applied to the treated $Mn_3O_4$ powder for incipient wetness impregnation and again dried. The material (1:1 W:Ce by mole) can then calcined at 1100 °C.

The support phase of the active material is a metal oxide ($M_xO_y$), wherein M is at least one metal selected from the group consisting of Al, Si, Mg, Ca, Sr, Ba, Sc, Y, La, Ce, Ti, Zr, Hf, and mixtures of Al, Si, Mg, Ca, Sr, Ba, Sc, Y, La, Ce, Ti, Zr, Hf, and/or Mn. The support phase is preferably a ceramic. As non-limiting illustrative examples, the support phase can be silica ($SiO_2$), magnesia (MgO), ceria ($CeO_2$), titania ($TiO_2$), zirconia ($ZrO_2$), cordierite ($2MgO\ 2Al_2O_3\ 2SiO_2$), mullite ($3Al_2O_3\ 2SiO_2$), aluminum titanate ($Al_2TiO_5$), magnesium aluminate ($MgAl_2O_4$), calcium-stabilized zirconia (CaO—$ZrO_2$), magnesium-stabilized zirconia (MgO—$ZrO_2$), yttria-stabilized zirconia ($Y_2O_3$—$ZrO_2$), yttria ($Y_2O_3$), barium zirconate ($BaZrO_3$), and strontium zirconate ($SrZrO_3$). Aluminum oxide ($Al_2O_3$, a.k.a. alumina) is a preferred support phase, and is referred to herein in the following discussion by way of example for the purposes of simplicity and clarity. $Al_2O_3$ can be in various crystallographic forms, including but not limited to, alpha-$Al_2O_3$, theta-$Al_2O_3$, and gamma-$Al_2O_3$.

The support phase can be any shape. Some non-limiting examples include honeycomb monoliths, foams, pellets, and beads in spherical, ellipsoidal, and polyhedral shapes. In a reverse flow reactor, a honeycomb monolith is a preferred shape of the support phase. In a fluidized bed reactor, a solid granular material is shaped as tiny spherical beads that can be suspended at high enough velocities and cause them to behave as though it were a fluid.

In any embodiment of this disclosure, the composite phase can comprise a mixed oxide including an oxide of the transition metal of the active phase and an oxide of the metal of the support phase, for example, a mixed oxide comprising both manganese oxide and alumina, such as $(Mn,Al)_3O_4$, which may help assure robustness of the active material. The intermediate composite layer can help accommodate any thermal expansion mismatch between the active phase and the support phase.

The composite phase preferably comprises a spinel structure, especially where the active phase comprises a spinel structure. For example, the composite phase can comprise ($M^1$, $M^2$) spinel of the formula $M^1_AM^2_BO_4$, wherein $M^1$ is the transition metal, $M^2$ is the second element, and A and B may range from 0.2 to 2.8 wherein the sum of A+B=3. Preferably, $M^1$ is Mn and $M^2$ is Al, more preferably where A is about 1 and B is about 2.

Often, a liquid mixture comprised of both manganese and aluminum precursors or a slurry mixture comprising of both manganese oxide and alumina powder can be rapidly dried to form a dry mixed oxide powder by the use of a spray dryer. All spray dryers use some type of atomizer or spray nozzle to disperse the liquid mixture or the slurry mixture into a controlled drop size spray. Drop sizes from 10 μm to 500 μm can be achieved. The dry powder is often free flowing.

As one example, the composite phase of the mixed oxide dry powder can further be heat treated to form an $MnAl_2O_4$ and/or $Mn_2AlO_4$ spinel phase after sintering at the high temperatures which are often used to fabricate the support phase. Compared to a pure alumina support phase, an $MnAl_2O_4$ and/or $Mn_2AlO_4$ spinel phase serves as an intermediate phase between two completely differently manganese oxide and alumina phases. Use of such a mixed oxide support phase is particularly beneficial when the manganese oxide based active materials of this disclosure are prepared into a solid granular material to be adapted in a fluidized bed reactor. The mixed oxide particles provide a better thermal expansion match to a manganese oxide active phase and increase attrition resistance when they are flown through a fluidized bed reactor.

One aspect in this disclosure is to improve adhesion of the manganese oxide active phase on the support phase by a wash coating method. Due to the thermal expansion mismatch between manganese oxide and the alumina support phase, the wash coated manganese oxide tends to detach from the support phase. This issue can be overcome by forming an intermediate layer of the composite phase through a proper pretreatment method.

Figure 2:
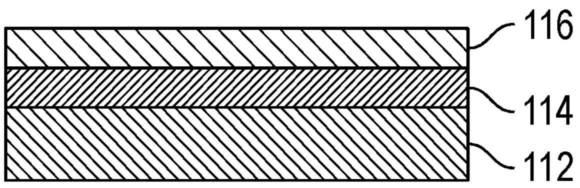
FIG. 2 is a simplified schematic diagram of an alumina substrate, a manganese-aluminum composite layer, and a washcoat of a manganese active phase, according to embodiments of this disclosure.
Figure 3:
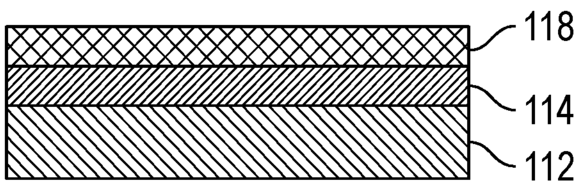
FIG. 3 is a simplified schematic diagram of an alumina substrate, a manganese-aluminum composite layer, and a washcoat of a manganese active phase doped with sodium tungstate promoter, according to embodiments of this disclosure.

As a non-limiting example, with reference to FIGS. 1-3, a dense alumina support phase 112 is coated with an active phase $Mn_3O_4$ powder 114, with nominal thickness of about 5 μm. The construct is sintered at a temperature ranging from 1300 °C to 1500 °C Due to this initial high temperature sintering, the $Mn_3O_4$ coating 114 is transformed into an $(Mn,Al)_3O_4$ composite phase and provides a better thermal expansion match to the alumina support phase. The intermediate $(Mn,Al)_3O_4$ composite phase 114 is not catalytically active, therefore, the thickness of this layer can be balanced between adhesion and functionality. After the high temperature sintering, adhesion can be assessed to determine whether the sintering temperature is sufficient to give the required reaction between the active phase and the support phase to form an intermediate $(Mn,Al)_3O_4$ composite phase 114. Then, a second wash coating 116 with an active phase $Mn_3O_4$ powder is applied on the intermediate $(Mn,Al)_3O_4$ composite layer 114 at thickness varying from 10~50 μm, and further sintered at a temperature ranging from 1000 °C to 1300 °C Now the $Na_2WO_4$ promoter can be applied on the active $Mn_3O_4$ phase 116 to form the Mn—W active phase 118. Hence, one preferred embodiment of the manganese oxide based active materials 110 is comprised of manganese oxide active phase with an $Na_2WO_4$ promoter as a top layer 118, an intermediate $(Mn,Al)_3O_4$ composite phase 114, and alumina support phase as a bottom layer 112.

In any embodiment, the composite phase can comprise a plurality of graded phases comprising mixed oxides of both of the first and second elements having a successively relatively higher content of the first element adjacent the active phase and a successively relatively higher content of the second element adjacent the support phase. For example, where the support phase is an alumina substrate, and the active phase comprises a manganese oxide doped with alumina at a 10:1 molar ratio ($MnAl_{0.1}O_x$), the composite phase can comprise a first intermediate phase of $MnAlO_x$ (1:1 molar ratio Mn:Al) adjacent to the support phase, and a second intermediate phase of $Mn_2AlO_x$ (2:1 molar ratio Mn:Al) adjacent the active phase; or the composite phase may further comprise and a third intermediate phase of $MnAl_{0.2}O_x$ (5:1 molar ratio Mn:Al) between the second intermediate phase and the active phase and a second intermediate phase adjacent the first intermediate phase of $Mn_2AlO_x$ (2:1 molar ratio Mn:Al); and so on.

The active material can be used in any reactor where an oxygen transfer agent is needed, preferably in an oxidative dehydrogenation (ODH) reactor. For example, the active material can be used in an ODH chemical looping reactor such as an RFR where the active material replaces the conventional fuel-oxidant combustion system. In this case, the active materials can be fabricated in a shape of a honeycomb monolith and placed in the middle of the RFR. Using the active material in an RFR in this format: a) avoids or significantly reduces the need to provide separate fuel for the regeneration step, eliminating the challenges with the combustion system in an RFR, b) selectively transfers oxygen to the endothermic reaction, which could potentially enable new chemistries or drive the reaction equilibrium forward in other cases, and c) simplifies reactor operation and downstream product handling.

Figure 4:
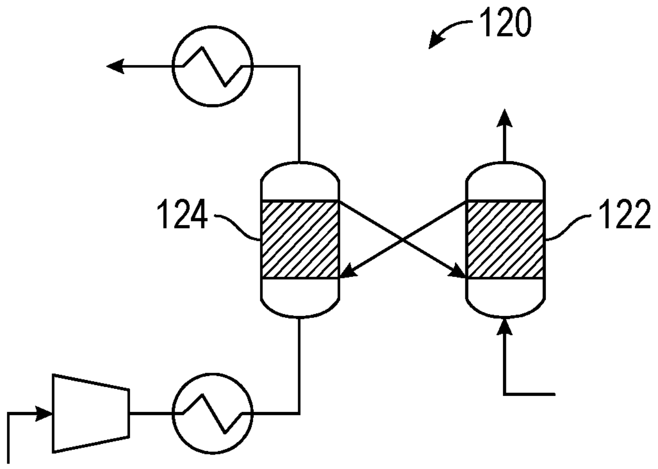
FIG. 4 is a simplified schematic diagram of a fluidized bed reactor according to embodiments of this disclosure.

Similarly, the same chemical looping oxidative dehydrogenation process can be realized in a fluidized bed reactor process 120 as shown in FIG. 4, which shows the schematic of a fluidized bed reactor system 120 for converting ethane to ethylene with reactor 122 and regeneration of the active material with air in regenerator 124. In this case the active materials can be fabricated in a shape of a particle that enables circulation between the reactor 122 and the regenerator 124. In this two-step process, the active material donates oxygen from its lattice to convert ethane to ethylene and water in the reactor 122. After the active material is reduced, it is transferred back to the regenerator 124 to complete the redox cycle. This fluidized bed process scheme eliminates drawbacks of conventional ODH because an expensive air separation unit is no longer required, and the overall process is safer since ethane is not mixed with oxygen. This scheme also reduces energy consumption and $CO_2$ emissions in comparison with steam crackers due to selective oxidation of hydrogen that provides energy needed for the ethane dehydrogenation. Moreover, higher single pass yields of ethylene and in-situ hydrogen oxidation reduces the load for the downstream separation and purification steps. With proper design of the active materials to avoid over-oxidation of ethane or ethylene, the use of lattice oxygen in the active materials can also lead to higher ethylene selectively. The presently disclosed process can incorporate reactors, systems, and reaction processes for contacting hydrocarbon reactant in the presence of oxygen stored and released from the active material. The active material can often be one having thermal mass, or alternatively or in addition, can be located proximate to, on, or within a thermal mass located in at least one region of the reactor. The heat in the reactor and the presence of the active material result in the formation of olefin products along with steam, carbon monoxide, and/or carbon dioxide. While not wishing to be bound by any theory or model, it is believed that a part of the conversion process is a result of thermal or catalytic dehydrogenation of the hydrocarbons to olefins and hydrogen, followed by a subsequent step in which hydrogen or hydrocarbons react with oxygen from the active material to form water, carbon monoxide, and carbon dioxide.

One suitable reaction process incorporating the active material according to the present disclosure is exemplified the oxydehydrogenation (ODH) reaction according to the equation:

$$C_2H_6+MO \rightarrow C_2H_4+M+H_2O \text{ (steam)},$$

wherein MO is a metal oxide that can comprise one or more transition metal oxides, such as of manganese or tin, and which can further comprise one or more of magnesium, calcium, strontium, aluminum, cobalt, zirconium, yttrium, cerium, lanthanum, silicon, titanium, sodium, tungsten, or so on.

In any embodiment the exothermic regeneration of the active material during the regeneration step can provide the heat necessary to conduct the subsequent endothermic reaction in the reaction step, thereby eliminating fuel-air based combustion systems and the accompanying generation of carbon oxides and coke, and simplifying reactor design significantly. The disclosed method has advantages over other reactor systems (e.g., circulating fluid beds) that could employ the described active material, due to better thermal management and less agitation of the active material.

Oxygen storage and release for carrying out the hydrocarbon conversion is achieved by regenerating the active material. In certain aspects, a thermal mass is utilized which comprises, consists essentially of, or consists of active material. Oxygen is transferred from an oxidant to the active material for storage within the active material. Oxygen is typically transferred and stored as the oxidant is passed through the thermal mass region of the reactor. Oxygen can be transferred from the oxidant to the active material for storage with the active material in any form, e.g., as oxygen atoms, oxygen ions, or as a component of an oxygen-containing molecule (e.g., an oxygen precursor). Stored oxygen released from the active material for reacting with the hydrocarbon reactant to produce the first reaction mixture can be in any form, e.g., as oxygen atoms, oxygen ions, or as a component of an oxygen-containing molecule (e.g., an oxygen precursor).

Storage of the oxygen causes the thermal mass to be heated. For example, storage of the oxygen can be accompanied by exothermic reaction with the thermal mass. Thus, the oxidant itself can be considered a heating fluid for heating the flow-through reactor. The regeneration step often proceeds according to the equation:

$$2M+O_2 \rightarrow 2MO+\text{heat}.$$

Presented herein is a process for converting a $C_1$ to $C_6$ alkane to a $C_2$ to $C_6$ olefin, comprising passing an oxygen-containing gas in a first direction through a reverse flow reactor (RFR); contacting the oxygen-containing gas with an active material comprising a metal oxide to heat the reactor; terminating the oxygen-containing gas flow; optionally purging the oxygen-containing gas from the reactor with steam, inert gas, or vacuum purge; passing a $C_1$ to $C_6$ alkane stream through the reactor in a second direction and past the active material; reacting oxygen from the oxygen transfer agent with the $C_1$ to $C_6$ alkane under conditions sufficient to form $C_2$ to $C_6$ olefin and steam; optionally purging the $C_1$ to $C_6$ alkane and olefin from the reactor with steam or inert gas; and withdrawing an effluent comprising the $C_2$ to $C_6$ olefin from the reactor.

Figure 5:
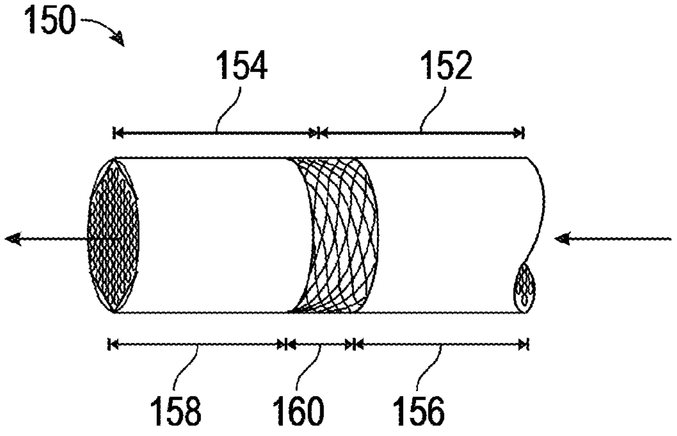
FIG. 5 is a simplified schematic diagram of a flow-through reactor according to embodiments of this disclosure.

FIG. 5 illustrates a flow-through reactor, for example a reverse-flow reactor 150 having a first region 152 and a second region 154, with the first and second regions 152, 154 comprising thermal mass. Valves, for example poppet valves or another suitable type of valve, are used to regulate flows of all gases entering and exiting the reactor. The process described herein, however, is not limited to being conducted in reverse flow reactors having two regions, and the FIG. 5 description is not intended to foreclose other configurations of thermal mass. For example, the thermal mass material may be coupled together as a continuous mass in a single region or more than one region or separate thermal masses may be coupled together, forming more than one region. As another example, the thermal mass can be a continuous mass of a ceramic material having an oxygen-storage functionality.

The terms first and second thermal mass segments are used for convenience in FIG. 5 to particularly describe the heating and cooling of the regions of the thermal mass as the oxygen transfer reaction progresses through the flow of the feeds and conversion products through the reactor. The reaction being carried out results in sorption and release of heat in a manner that is effective in the continuous conversion of alkanes in the hydrocarbon reactant feed to produce a reaction mixture comprising $C_2$ to $C_6$ olefin compositions.

The reactor in FIG. 5 includes a continuous thermal mass, which is represented as a first thermal mass segment 156 and a second thermal mass segment 158, with the thermal mass including a reaction zone 160. The reaction zone 162 comprises at least one active material, which can be further incorporated on or in either or both of the thermal mass segments 156, 158. For example, all of the active material can be incorporated in or on either thermal mass segment 156 or thermal mass segment 158 or a portion of the active material can be incorporated in or on both thermal mass segment 156 and thermal mass segment 158. Advantageously, the active material is incorporated primarily in reaction zone 160.

Figure 6:
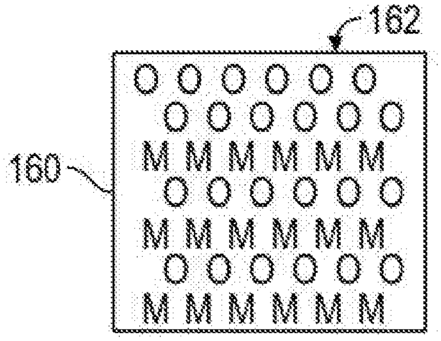
FIG. 6 is a simplified schematic diagram of an active material in an oxidized state according to embodiments of this disclosure.
Figure 7:
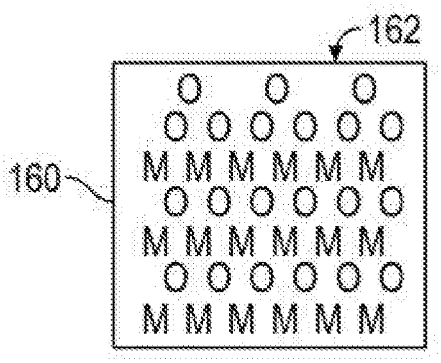
FIG. 7 is a simplified schematic diagram of the active material of FIG. 6 in a reduced state according to embodiments of this disclosure.

FIGS. 6 and 7 are a characterization of a cross-sectional enlargement of the reaction zone 160 in an oxidized state following regeneration as seen in FIG. 6, or in a reduced state following contribution of oxygen atoms to an ODH reaction as seen in FIG. 7. "M" in FIGS. 6-7 refers to a metal center, representative of at least one active material. "O" in FIGS. 6-7 refers to an oxidant such as oxygen, which has been stored in the reaction zone 160 in FIG. 6 from a regeneration step in which heating fluid comprising an oxidant is flowed through the reactor. Conversely, the oxidant "O" is at least partially depleted from the reaction zone 160 in FIG. 7 following a reaction step in which reactant feed comprising $C_2$ to $C_6$ alkanes is flowed through the reactor and converted to the corresponding olefin and the hydrogen produced converted by reaction with the oxygen from the active phase to water.

As seen in FIG. 6, oxygen from the oxidant can be stored in a portion of the thermal mass of the reaction zone containing active material "M". As the oxidant is flowed through the reactor, at least a portion of the oxidant (i.e., oxygen) is stored with the active material. The oxygen can migrate from the surface 162 of the thermal mass toward a more central region of the thermal mass, becoming more deeply embedded in the thermal mass. As flow of oxidant continues, the storage of oxygen can reach a maximum or saturation-type level.

As the hydrocarbon reactant (e.g., ethane) is flowed through the reactor, the stored oxygen is released as shown in FIG. 7, and oxidatively dehydrogenates the alkane in the hydrocarbon reactant to produce a reaction mixture comprising a $C_{2+}$ olefin composition, with minimal amounts of carbon oxides, hydrogen and coke formed.

Operating pressures may include a pressure of at least atmospheric pressure (zero pressure, gauge), such as ≥4 pounds per square inch gauge (psig) (28 kilo Pascals gauge (kPag)), or ≥10 psig (69 kPag), or ≥36 psig (248 kPag), or ≥44 psig (303 kPag), or ≥103 psig (709 kPag), but may be ≤300 psig (2064 kPag), or ≤100 psig (689 kPag), or ≤30 psig (206 kPag).

Residence times in the reactor (including any recuperative preheat and quench) may be ≤10 seconds and even ≤5 seconds, or in the range of 0.005 seconds to 5 seconds, 0.01 seconds to 3 seconds, 0.02 seconds to 1.5 seconds, or 0.05 to 1 seconds. For a reverse-flow reactor, the process may operate at cycle times ≥0.5 second, such as in the range of 1 second to 240 seconds, in the range of 5 seconds to 120 seconds, in the range of 10 seconds to 90 seconds, or in the range of 20 seconds to 60 seconds.

Also, as may be appreciated, these different pressures and residence times may be utilized together to form different combinations depending on the specific configuration of equipment.

Figure 8:
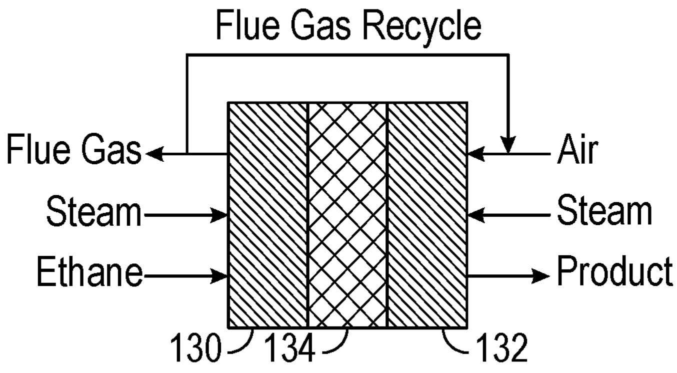
FIG. 8 is a simplified schematic diagram of an RFR according to embodiments of this disclosure.

FIG. 8 is a schematic view of one advantageous configuration for the RFR used to conduct the presently disclosed process, which comprises: (1) In-flows of $C_2$-$C_6$ hydrocarbon, air, flue gas recycle, and steam; (2) Out-flows of flue gas and reaction product; (3) a recuperative section 130 for heat exchange (preheat) between flue gas and ethane; (4) a recuperative section 132 for heat exchange (quench) between air and reaction product; and (5) a section 134 comprising the active material. The flows may be regulated by valves.

The reactor operation comprises alternating flow of streams comprising air and hydrocarbon. In some embodiments, steam or inert gas is flowed to purge air or hydrocarbon from the reactor between switches from regeneration flow and product formation flow. In other embodiments, the purge is accomplished by applying vacuum or a combination of vacuum, steam, or inert gas. In yet other embodiments, no purge is applied. The temperature of the effluents is controlled by the level of flue gas recycle and the size of the heat exchange sections. The product yield is controlled by the intrinsic active material properties, the loading of active material in the reactor, and the duration for which hydrocarbon is flowed to the reactor.

When used in an RFR, the active materials disclosed herein enable very high yields of ethylene from hydrocarbon feeds, such as those comprising ethane, propane, butane, or naphtha. The active material releases oxygen when contacted with hydrocarbons during a reaction step, leading to the formation of primarily ethylene, steam, and other olefins (endothermic reactions). The yields of carbon oxides, hydrogen, methane, and other alkanes are suppressed.

The regenerated active material comprises the oxidized state of the active material. The active material can be packed in the reactor in the form of pellets, washcoated ceramic monoliths, such as honeycomb monoliths, which have at least one channel for establishing the specified flows of oxidant and hydrocarbon reactant. The active material may also be extruded in the form of such a monolith.

A relative flow of oxygen-containing gas and $C_2$-$C_6$ alkane are sufficient to achieve effluent temperatures below 400 °C, or above 550 °C. For example, the weight ratio of the flow rates of oxidizer gases (e.g., air, flue gas recycle, and steam) to ethane can be between 2.4 to 3.0. Low-temperature effluent is advantageous because it requires less capital to recover heat as steam. A heat exchanger can be used to recover heat from the reactor effluents, by boiling water to make steam. When the effluent is recovered at a higher temperature, it is possible to generate high pressure steam by flowing it though a boiler. The high pressure steam can be used to supply the purge steam to the reactor and for other purposes, such as generating work in a turbine expander.

The active materials disclosed herein are not limited to use in an RFR. The reactor can be a reverse flow reactor, a circulating fluid bed reactor, or even a co-flow cyclic reactor. The process for converting a $C_1$ to $C_6$ alkane to a $C_2$ to $C_6$ olefin can comprise passing an oxygen-containing gas through a reactor; contacting the oxygen-containing gas with an oxygen transfer agent such as those described above to sorb the oxygen and heat the reactor; terminating the oxygen-containing gas flow; optionally purging the oxygen-containing gas from the reactor with steam, inert gas, or vacuum; passing a $C_1$ to $C_6$ alkane stream through the reactor past the oxygen transfer agent; desorbing oxygen from the oxygen transfer agent; reacting the desorbed oxygen with the $C_1$ to $C_6$ alkane under conditions sufficient to form $C_2$ to $C_6$ olefin and steam; and optionally purging the $C_1$ to $C_6$ alkane and olefin from the reactor with steam, inert gas, or vacuum.

LISTING OF EMBODIMENTS

Accordingly, this disclosure provides the following non-limiting embodiments:

1. An active material, comprising:

an active phase comprising an oxide of a first element selected from transition metal elements, wherein the transition metal oxide is reversibly oxidizable and/or reducible between oxidized and reduced states, wherein the transition metal oxide is present in the oxidized state, the reduced state, or a combination thereof;

a support phase comprising an oxide of a second element selected from IUPAC Group 2-14 elements; and a composite phase intermediate the active phase and the support phase, the composite phase comprising a mixed metal oxide of the first element and the second element.

2. The active material of embodiment 1, wherein the transition metal oxide comprises manganese.

3. The active material of embodiment 1, wherein the oxidized state of the transition metal oxide comprises a spinel structure.

4. The active material of embodiment 1, wherein the active phase further comprises a promoter that suppresses carbon oxidation in a redox reaction, preferably wherein the promoter is selected from tungsten, sodium, cerium, and combinations thereof, more preferably wherein the promoter comprises sodium tungstate.

5. The active material of embodiment 4, wherein the promoter in the active phase comprises from 5 to 20 weight percent, preferably from 7 to 12 weight percent, based on the total weight of the active phase.

6. The active material of embodiment 1, wherein the active phase exhibits an open pore volume in a range of 5 to 60 volume percent, preferably 10 to 50 volume percent, more preferably 20 to 40 volume percent, based on the total volume of the active phase.

7. The active material of embodiment 1, wherein the active phase is doped with up to 20 percent by weight of the active phase of the second element, preferably wherein the second element comprises aluminum.

8. The active material of embodiment 1, wherein the active phase further comprises a selectivity modifier, preferably cerium.

9. The active material of embodiment 1, wherein the active phase comprises from 1 to 20 percent by weight, preferably from 4 to 15 percent by weight, more preferably from 5 to 10 percent by weight, based on the total weight of the active material.

10. The active material of embodiment 1, wherein the composite phase comprises a spinel structure.
11. The active material embodiment 1, wherein the composite phase comprises ($M^1$, $M^2$) spinel of the formula $M^1_AM^2_BO_4$, wherein $M^1$ is the transition metal, $M^2$ is the second element, and A and B may range from 0.2 to 2.8 wherein the sum of A+B=3.
12. The active material of embodiment 11, wherein the composite phase comprises spinel of the formula $M^1_AM^2_BO_4$, wherein $M^1$ is Mn and $M^2$ is Al, preferably where A is about 1 and B is about 2.
13. The active material of embodiment 1, wherein the composite phase comprises a plurality of graded phases having a successively higher content of the first element adjacent the active phase and a successively higher content of the second element adjacent the support phase.
14. The active material of embodiment 1, wherein the composite phase comprises a thickness of from 1 to 10 microns and the active phase comprises a thickness of from 5 to 50 microns.
15. The active material of embodiment 1, wherein the second element is selected from Al, Si, Mg, Ca, Sr, Ba, Sc, Y, La, Ce, Ti, Zr, Hf, and mixtures of Al, Si, Mg, Ca, Sr, Ba, Sc, Y, La, Ce, Ti, Zr, Hf, and/or Mn, preferably the second element comprises aluminum, more preferably aluminum doped with manganese.
16. The active material of embodiment 1, wherein the support phase comprises a ceramic.
17. The active material of embodiment 1, wherein the support phase is selected from alumina ($Al_2O_3$), silica ($SiO_2$), magnesia (MgO), ceria ($CeO_2$), titania ($TiO_2$), zirconia ($ZrO_2$), cordierite ($2MgO\ 2Al_2O_3\ 2SiO_2$), mullite ($3Al_2O_3\ 2SiO_2$), aluminum titanate ($Al_2TiO_5$), magnesium aluminate ($MgAl_2O_4$), calcium-stabilized zirconia (CaO—$ZrO_2$), magnesium-stabilized zirconia (MgO—$ZrO_2$), yttria-stabilized zirconia ($Y_2O_3$—$ZrO_2$), yttria ($Y_2O_3$), barium zirconate ($BaZrO_3$), strontium zirconate ($SrZrO_3$), and combinations thereof.
18. The active material of embodiment 1, wherein the oxidized state of the transition metal oxide comprises a spinel structure of the formula $M^1_3O_4$, the composite phase comprises a spinel structure of the formula $M^1_AM^2BO_4$, and the support phase comprises a ceramic of the formula $M^2_2O_3$, wherein $M^1$ is a transition metal, $M^2$ is selected from IUPAC Group 2-14 elements, and A and B may range from 0.2 to 2.8 wherein the sum of A+B=3, preferably wherein $M^1$ is Mn and $M^2$ is Al.
19. A reactor comprising the active material of embodiment 1 disposed in a chemical looping reactor enclosure.
20. A method of making the active material of embodiment 1, comprising the steps of:
    providing a substrate comprising the support phase;
    forming a layer of the composite phase on the substrate; and
    coating the layer of the composite phase with the active phase.
21. The method of embodiment 20, further comprising doping the active phase, preferably manganese oxide, with a promoter, preferably sodium tungstate.
22. The method of embodiment 20, further comprising doping the active phase, preferably manganese oxide, with the second element, preferably aluminum.
23. The method of embodiment 20, further comprising:
    coating the support phase, preferably alumina, with a first coating of an oxide of the transition metal element, preferably manganese oxide;
    sintering the first coating on the support phase to form the composite phase, preferably $(Mn,Al)_3O_4$ spinel structure;
    coating the composite phase with a second coating of the oxide of the transition metal element, preferably manganese oxide;
    heat treating the second coating to form the active phase; and
    optionally doping the active phase with a promoter.
24. The method of embodiment 20, wherein the formation of the composite phase comprises co-precipitating an oxide of the transition metal element and an oxide of the IUPAC Group 2-14 element.
25. A regenerative reaction process, comprising the sequential steps of:
    (a) disposing the active material according to embodiment 1 into a reactor member;
    (b) for a first period of time, contacting the oxidized state of the active phase of the active material in the reactor member with an oxidizable reactant at pressure, temperature, and flow rate conditions to reduce the active phase to the reduced state and form a reaction product;
    (c) for a second period of time, contacting the reduced state of the active phase of the active material in the reactor member with an oxidant to regenerate the active phase to the oxidized state for reduction in step (b); and
    (d) sequentially repeating steps (b) and (c), preferably in the same reactor, one or more times.

EXAMPLES

These examples demonstrate the concept can be advantageously utilized to improve ethane pyrolysis yields, reduce fuel demand, eliminate the fuel-oxidant based combustion system, and/or simplify the RFR design.

Example 1

Figure 9:
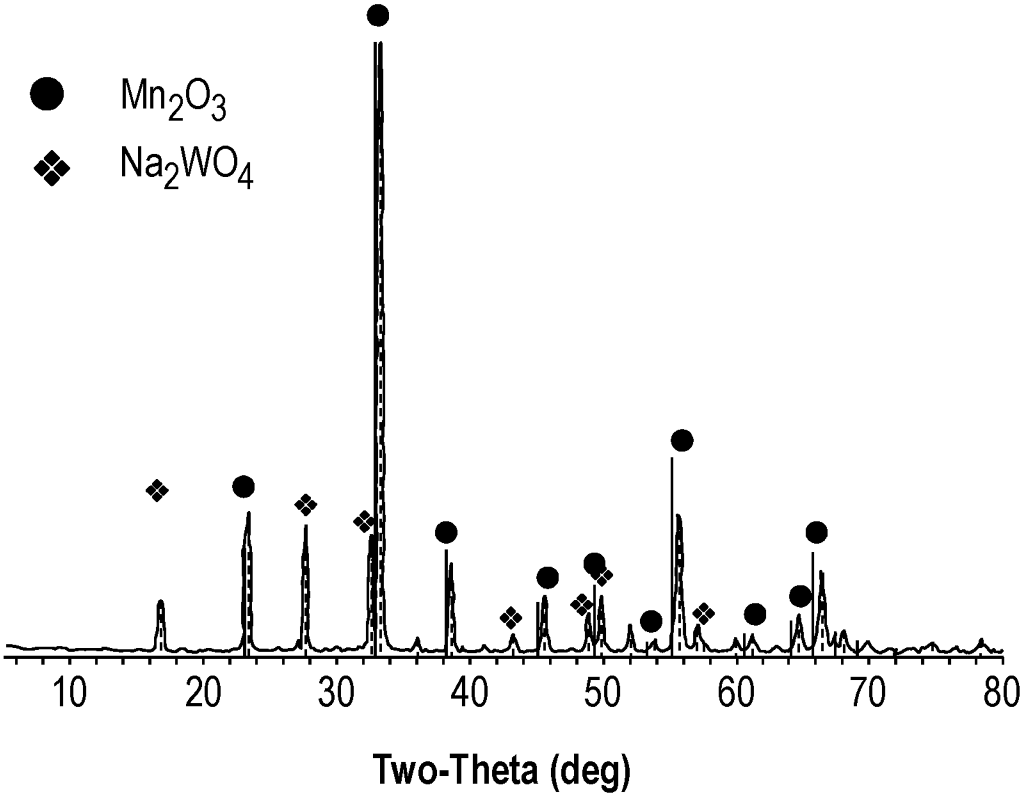
FIG. 9 is an X-ray diffraction pattern of aluminum doped manganese oxide with sodium tungstate promoter (lower graph) and pure manganese oxide (upper graph) according to an example of this disclosure.
Figure 10:
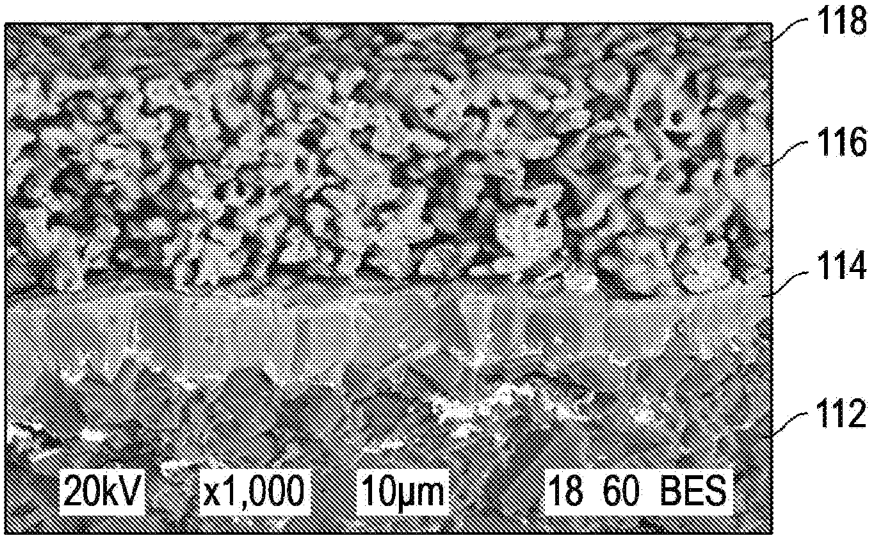
FIG. 10 is a cross sectional SEM image of an oxygenically active material according to an example of this disclosure.

In this example, the long-term retention of a washcoat on a composite phase was demonstrated. Manganese oxide based active materials were prepared by washcoating an $Mn_3O_4$ active phase on an alumina support phase with and without a composite phase. The washcoating was applied to alumina monoliths in the shape of honeycomb monoliths with 15.5 cells/cm$^2$ (100 cells/in.$^2$), 50% open frontal area (OFA), 2.36 cm (6 in.) length, 6.35 cm (2.5 in.) diameter. In Example 1A (comparative), $Mn_3O_4$ (25 g) was washcoated onto a cylindrical alumina substrate. In Example 1B (inventive), 7 g of $Mn_3O_4$ were washcoated onto the cylindrical alumina substrate, the monolith was heated to 1450 °C for 1 h, then subsequently, another 25 g $Mn_3O_4$ was washcoated onto the monolith, and the monolith was then heated to 1000 °C for 1 h. FIG. 9 shows an X-ray diffraction (XRD) pattern of the aluminum doped manganese oxide with sodium tungstate promoter superimposed on the XRD pattern for the pure manganese oxide, and FIG. 10 shows a cross sectional scanning electron microscopy (SEM) of the corresponding aluminum doped manganese oxide with sodium tungstate promoter.

The washcoated monoliths were installed in a reverse flow reactor (RFR) between two alumina substrates (not washcoated) of 7.62 cm (3 in.) length but otherwise similar dimensions. The manganese oxide based active materials enabled redox reactions at fast time scales (~1-5 sec) with oxygen transfer to the lattice during regeneration step (high PO2, exothermic reaction) and oxygen transfer to the feed (low PO2, endothermic reaction) during the reaction step. The RFR was preheated to between about 600° and 650 °C. At that point, a cycling program was established involving flows of 1) 50% hydrogen/nitrogen at 10 sLm in one direction for 6 seconds, 2) nitrogen at 5 sLm in the same direction for 6 seconds, 3) air at 25 sLm in the same direction for 6 seconds, and 4) nitrogen at 40 sLm in the opposite direction for 6 seconds. Feed gases were preheated to 300 °C.

Figure 11:
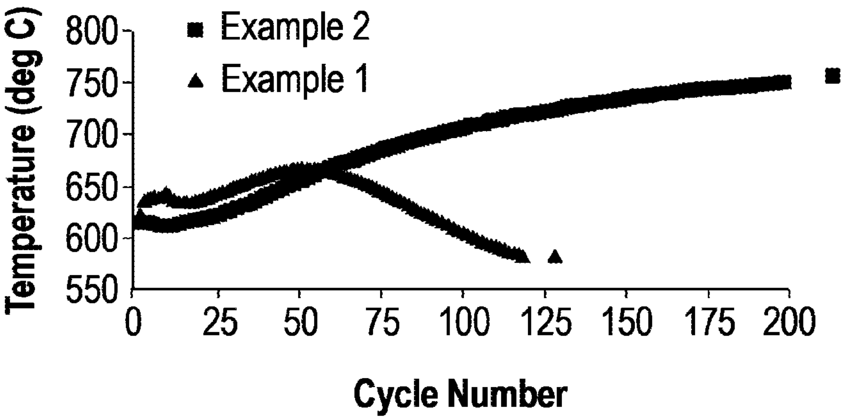
FIG. 11 is a graph of reactor temperature versus operating cycles for a reverse flow reactor system according to an example of this disclosure and a comparative.

The temperature at the reactor center versus the number of complete cycles (steps 1 to 4) is shown in FIG. 11. For Example 1A, the temperature started increasing initially, indicating that heat was generated by combusting hydrogen with oxygen stored on the monolith, but then the temperature decreased after about 50 cycles indicating that heat was no longer generated by combusting hydrogen with oxygen stored on the monolith. Later analysis of the spent material showed that the washcoat had separated from the monolith and blocked flow through the channels. The washcoat detachment was associated with the poor performance of Example 1A. For Example 1B, the reactor temperature continued to increase due to hydrogen combustion from oxygen in the manganese. Compared to Example 1A, the loss of active phase was substantially reduced in Example 1B.

Example 2

This example demonstrates that alumina can be doped in the manganese active phase for long-term integrity without adversely impacting activity. In Example 2A, manganese(II) acetate tetrahydrate (25.92 g) was added to 720 mL water to form a manganese solution. Isopropanol (0.81 mL) was added to the manganese solution and heated at 85 °C until a gel formed. The gel was calcined at 900 °C for 20 h to form a manganese powder. In a separate container, 0.632 g sodium tungstate dihydrate and 0.67 g triethanolamine were added to 0.66 g water to form a tungsten solution. The tungsten solution was added to the manganese powder. The resulting material was heated at 900 °C for 8 h.

For example 2B, aluminum isoproproxide (2.16 g) was added to 130 mL water and heated at 90 °C for 1 h to form an aluminum suspension. In a separate container, 25.92 g manganese(II) acetate tetrahydrate was added to 720 mL water to form a manganese solution. The manganese solution was added to the aluminum suspension and the resulting mixture was heated at 90 °C until a gel formed. The gel was calcined at 900 °C for 20 h to form a manganese-aluminate powder. In a separate container, 0.632 g sodium tungstate dihydrate and 0.67 g triethanolamine were added to 0.66 g water to form a tungsten solution. The tungsten solution was added to the manganese aluminate powder. The resulting material was heated at 900 °C for 8 h.

The materials of examples 2A and 2B were run in an ethane oxidation test. In each test, 0.4 grams of material was loaded in a quartz reactor and heated to 850 deg C while flowing 10% oxygen/nitrogen. The oxygen was purged with argon and a flow of 0.2 std L/min of ethane was established through the reactor. The concentrations of species in the products were measured and averaged over the first 8 seconds of ethane exposure. As seen in Table 1, the sample comprising alumina had similar performance to the base sample without alumina.

TABLE 1

| | Example: | |
|---|---|---|
| | 2A | 2B |
| Manganese oxide | | |
| Al:Mn, mol/mol | 0:10 | 1:10 |
| Product Species | | |
| CO, dry mol % | 0.6 | 0.6 |
| CO2, dry mol % | 0.8 | 0.9 |
| H2, dry mol % | 18.7 | 18.8 |
| Methane, dry mol % | 9.0 | 9.6 |
| Ethane, dry mol % | 24.6 | 24.2 |
| Ethylene, dry mol % | 46.3 | 45.9 |

When the test is extended, the sample comprising alumina will have enhanced stability over long-term tests.

Example 3

In this example, alumina coupons were coated with inks of various manganese and aluminum oxides to investigate the integrity of the coating. The inks were prepared as follows:

Ink A ($MnAlO_x$): Aluminum nitrate nonahydrate (303.86 g, 0.81 mol) and manganese(II) nitrate tetrahydrate (203.32 g, 0.81 mol) were dissolved in 500 mL water in a beaker under nitrogen sparge. In a separate beaker, ammonium carbonate (214.82 g, 2.24 mol) was dissolved in 1 L water. While stirring, the metal salt solution was added slowly to the ammonium carbonate solution. The mixture was allowed to stir for 2 h. The resulting precipitate was collected by vacuum filtration and washed with deionized water. The solid was transferred to an alumina crucible and dried in an oven at 110 °C. for 18 h and then calcined in a box furnace at 950 °C for 15 h (5 °C/min ramp) under air flow and then again after grinding for another 18 h followed by an additional calcination at 1300 °C under static air for 24 h (5 °C/min ramp and cool down).

Ink B ($Mn_2AlO_x$): Aluminum nitrate nonahydrate (185.69 g, 0.495 mol) and manganese(II) nitrate tetrahydrate (248.50 g, 0.990 mol) were dissolved in 500 mL water in a beaker under nitrogen sparge. In a separate beaker, ammonium carbonate (184.10 g, 1.92 mol) was dissolved in 860 mL water. While stirring, the metal salt solution was added slowly to the ammonium carbonate solution. The mixture was allowed to stir for 2 h. The resulting precipitate was collected by vacuum filtration and washed with deionized water. The solid was transferred to a crucible and dried in an oven at 110 °C for 18 h and then calcined in a box furnace at 950 °C for 15 h (5 °C/min ramp) under air flow and then again after grinding for another 18 h followed by an additional calcination at 1300 °C under static air for 24 h (5 °C/min ramp and cool down).

Ink C ($MnAl_{0.2}O_x$): Aluminum nitrate nonahydrate (92.89 g, 0.25 mol) and manganese(II) nitrate tetrahydrate (310.62 g, 1.24 mol) were dissolved in 500 mL water in a beaker under nitrogen sparge. In a separate beaker, ammonium carbonate (170.0 g, 1.77 mol) was dissolved in 860 mL water. While stirring, the metal salt solution was added slowly to the ammonium carbonate solution. The mixture was allowed to stir for 2 h. The resulting precipitate was collected by vacuum filtration and washed with deionized water. The solid was transferred to a crucible and dried in an oven at 110 °C for 18 h and then calcined in a box furnace at 850 °C for 18 h (5 °C/min ramp) under air flow.

Ink D ($MnAl_{0.1}O_x$): Aluminum nitrate nonahydrate (43.891 g, 0.117 mol) and manganese(II) nitrate tetrahydrate (293.68 g, 1.17 mol) were dissolved in 500 mL water in a beaker under nitrogen sparge. In a separate beaker, ammonium carbonate (142.22 g, 1.48 mol) was dissolved in 660 mL water. While stirring, the metal salt solution was added slowly to the ammonium carbonate solution. The mixture was allowed to stir for 2 h. The resulting precipitate was collected by vacuum filtration and washed with deionized water. The solid was transferred to a crucible and dried in an oven at 110 °C for 18 h and then calcined in a box furnace at 950 °C for 18 h (5 °C/min ramp) under air flow and then again after grinding for another 18 h.

Ink E ($MnO_x$: Manganese(II) nitrate tetrahydrate (293.68 g, 1.17 mol) was dissolved in 500 mL water in a beaker under nitrogen sparge. In a separate beaker, ammonium carbonate (142.22 g, 1.48 mol) was dissolved in 660 mL water. While stirring, the manganese salt solution was added slowly to the ammonium carbonate solution. The mixture was allowed to stir for 2 h. The resulting precipitate was collected by vacuum filtration and washed with deionized water. The solid was transferred to a crucible and dried in an oven at 110 °C for 18 h and then calcined in a box furnace at 450 °C for 20 h (5 °C/min ramp) under flowing air.

$Mn_3O_4$ Ink: $Mn_3O_4$ was purchased commercially and used as received.

General conditions: Metal oxide inks were formed by combining metal oxide with ink vehicle (Fuel Cell Materials) in a 1.7:1.0 mass ratio and then mixing by ball milling in a Retsch Mixer Mill MM 400 in a stabilized zirconia-lined vial of capacity of 10 mL charged with two 10 mm diameter stabilized zirconia balls for 1 h at a milling frequency of 30 Hz. Approximately 1 cm×1 cm alumina coupons were painted with 32 mg of ink per coupon per layer and allowed to dry for 18 h under ambient conditions prior to calcination in a box furnace under static air for each successive layer. The calcining times and temperatures are given in Table 2.

Example 3A (Inventive)

In this example, the alumina coupon was successively coated with Inks A, B, C, and D The calcining times and temperatures are given in Table 2. A final dark brown layer demonstrated good physical adhesion.

Example 3B (Inventive)

In this example, the alumina coupon was successively coated with Inks A, B, and D as in Example 3A, but without Ink C. The calcining times and temperatures are given in Table 2. Ink layer 3 showed cracks along which pieces could be readily mechanically chipped off.

Example 3C (Comparative)

In this example, the alumina coupon was coated with an ink made with $Mn_3O_4$. The ink was prepared and applied as in Example 3A. The calcining temperature was 1400 °C for 4 h. The manganese oxide layer could readily be sloughed off of the coupon substrate as a mostly intact single sheet, leaving brown staining behind on the coupon.

Example 3D (Comparative)

In this example, the alumina coupon was successively coated with an ink made with MnO. The ink was prepared and applied as in Example 3A. The calcining temperature was 1400 °C for 4 h. The manganese oxide layer could readily be sloughed off of the coupon substrate as a mostly intact single sheet, leaving brown staining behind on the coupon.

TABLE 2

| | Example | | | |
|---|---|---|---|---|
| | 3A | 3B | 3C | 3D |
| Substrate | $Al_2O_3$ | $Al_2O_3$ | $Al_2O_3$ | $Al_2O_3$ |
| Layer 1 | | | | |
| Mn/Al Oxide | Ink A $MnAlO_x$ | Ink A $MnAlO_x$ | $Mn_3O_4$ Ink | InkE $MnO_x$ |
| Calcination Conditions | 1400 °C, 4 h | 1400 °C, 4 h | 1400 °C, 4 h | 1400 °C, 4 h |
| Layer 2 | | | | |
| Mn/Al Oxide | Ink B $Mn_2AlO_x$ | Ink B $Mn_2AlO_x$ | None | None |
| Calcination Conditions | 1400 °C, 4 h | 1400 °C, 4 h | | |
| Layer 3 | | | | |
| Mn/Al Oxide | Ink C $MnAl_{0.2}O_x$ | Ink D $MnAl_{0.1}O_x$ | None | None |
| Calcination Conditions | 850 or 1000 °C, 4 h | 950 °C, 4 h | | |
| Layer 4 | | | | |
| Mn/Al Oxide | Ink D $MnAl_{0.1}O_x$ | None | None | None |
| Calcination Conditions | 950 °C, 4 h | | | |
| Adhesion | Good | Fair | Very poor | Very poor |

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. It is the express intention of the applicant not to invoke 35 U.S.C. § 112(f) for any limitations of any of the claims herein, except for those in which the claim expressly uses the words 'means for' together with an associated function and without any recitation of structure. The priority document is incorporated herein by reference.

What is claimed is:

1. An active material, comprising:

an active phase comprising a promoter and an oxide of a first element selected from transition metal elements, wherein:

the oxide of the first element is reversibly oxidizable and/or reducible between oxidized and reduced states, the oxide of the first element is present in the oxidized state, the reduced state, or a combination thereof, and the promoter comprises sodium, tungsten, or a combination thereof;

a support phase comprising an oxide of a second element selected from IUPAC Group 2-14 elements, wherein the first element and the second element are different with respect to one another; and a composite phase intermediate the active phase and the support phase, the composite phase comprising a mixed metal oxide of the first element and the second element, wherein the active phase is coated onto the composite phase, the composite phase having a thickness of from 1 to 10 microns.

2. The active material of claim 1, wherein the first element comprises manganese.

3. The active material of claim 1, wherein the active phase comprises from 5 to 20 weight percent of the promoter, based on the total weight of the active phase.

4. The active material of claim 1, wherein the active phase exhibits an open pore volume in a range from 5 to 60 volume percent, based on the total volume of the active phase.

5. The active material of claim 1, wherein the active phase is doped with up to 20 percent by weight of the second element, based on the total weight of the active phase, and wherein the second element comprises aluminum.

6. The active material of claim 1, wherein the active phase further comprises a selectivity modifier comprising cerium.

7. The active material of claim 1, wherein the active phase is present in a range from 1 to 20 percent by weight, based on the total weight of the active material.

8. The active material of claim 1, wherein the composite phase comprises ($M^1$, $M^2$) spinel of the formula $M^1_A M^2_B O_4$, wherein $M^1$ is the first element, $M^2$ is the second element, A and B range from 0.2 to 2.8, and the sum of A+B=3.

9. The active material of claim 8, wherein $M^1$ is Mn, $M^2$ is Al, A is about 1, and B is about 2.

10. The active material of claim 1, wherein the composite phase comprises a plurality of graded phases having a successively higher content of the first element adjacent the active phase and a successively higher content of the second element adjacent the support phase.

11. The active material of claim 1, wherein a thickness of the active phase is in a range from 5 to 50 microns.

12. The active material of claim 1, wherein the second element is selected from Al, Si, Mg, Ca, Sr, Ba, Sc, Y, La, Ce, Ti, Zr, Hf, and mixtures of Al, Si, Mg, Ca, Sr, Ba, Sc, Y, La, Ce, Ti, Zr, Hf, and/or Mn.

13. The active material of claim 1, wherein the support phase comprises a ceramic.

14. The active material of claim 1, wherein the support phase is selected from alumina ($Al_2O_3$), silica ($SiO_2$), magnesia (MgO), ceria ($CeO_2$), titania ($TiO_2$), zirconia ($ZrO_2$), cordierite ($2MgO\ 2Al_2O_3\ 2SiO_2$), mullite ($3Al_2O_3\ 2SiO_2$), aluminum titanate ($Al_2TiO_5$), magnesium aluminate ($MgAl_2O_4$), calcium-stabilized zirconia ($CaO—ZrO_2$), magnesium-stabilized zirconia ($MgO—ZrO_2$), yttria-stabilized zirconia ($Y_2O_3—ZrO_2$), yttria ($Y_2O_3$), barium zirconate ($BaZrO_3$), strontium zirconate ($SrZrO_3$), and combinations thereof.

15. The active material of claim 1, wherein:

the oxidized state of the oxide of the first element comprises a spinel structure of the formula $M^1_3O_4$, the composite phase comprises a spinel structure of the formula $M^1_A M^2_B O_4$, the support phase comprises a ceramic of the formula $M^2_2O_3$, $M^1$ is the first element, $M^2$ is the second element, A and B range from 0.2 to 2.8, and the sum of A+B=3.

16. A reactor comprising the active material of claim 1, disposed in a chemical looping reactor enclosure.

17. The active material of claim 1, wherein the promoter comprises sodium tungstate.

18. A method for making the active material of claim 1, comprising the steps of:

providing a substrate comprising the support phase;

forming a layer of the composite phase on the substrate; and coating the layer of the composite phase with the active phase.

19. The method of claim 18, further comprising doping the active phase with a promoter comprising sodium tungstate.

20. The method of claim 18, further comprising doping the active phase with the second element.

21. The method of claim 18, further comprising:

coating the support phase with a first coating of an oxide of the first element;

sintering the first coating on the support phase to form the composite phase;

coating the composite phase with a second coating of the oxide of the first element; and heat treating the second coating to form the active phase.

22. The method of claim 18, wherein forming the layer of the composite phase comprises co-precipitating an oxide of the first element and an oxide of the second element.

23. A regenerative reaction process, comprising the sequential steps of:

(a) disposing the active material of claim 1 comprising the oxide of the first element in the oxidized state into a reactor member;

(b) for a first period of time, contacting the active phase of the active material in the reactor member with an oxidizable reactant at pressure, temperature, and flow rate conditions to reduce the oxide of the first element to the reduced state and form a reaction product;

(c) for a second period of time, contacting the oxide of the first element in the reduced state in the reactor member with an oxidant to regenerate the oxide of the first element to the oxidized state for reduction in step (b); and (d) sequentially repeating steps (b) and (c) in the same reactor member one or more times.

24. An active material, comprising:

an active phase comprising an oxide of a first element selected from transition metal elements, wherein:

the oxide of the first element is reversibly oxidizable and/or reducible between oxidized and reduced states, the oxide of the first element is present in the oxidized state, the reduced state, or a combination thereof, and the active phase exhibits an open pore volume in a range from 5 to 60 volume percent, based on the total volume of the active phase;

a support phase comprising an oxide of a second element selected from IUPAC Group 2-14 elements, wherein the first element and the second element are different with respect to one another; and a composite phase intermediate the active phase and the support phase, the composite phase comprising a mixed metal oxide of the first element and the second element.

25. An active material, comprising:

an active phase comprising an oxide of a first element selected from transition metal elements, wherein:

the oxide of the first element is reversibly oxidizable and/or reducible between oxidized and reduced states, the oxide of the first element is present in the oxidized state, the reduced state, or a combination thereof, and a thickness of the active phase is in a range from 5 to 50 microns;

a support phase comprising an oxide of a second element selected from IUPAC Group 2-14 elements, wherein the first element and the second element are different with respect to one another; and a composite phase intermediate the active phase and the support phase, the composite phase comprising a mixed metal oxide of the first element and the second element, wherein a thickness of the composite phase is in a range from 1 to 10 microns.

* * * * *